(12) United States Patent
Terashima

(10) Patent No.: US 7,277,868 B2
(45) Date of Patent: Oct. 2, 2007

(54) METHOD AND SYSTEM FOR SUPPORTING TRADE OF SECURITIES

(75) Inventor: Shigehiko Terashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1176 days.

(21) Appl. No.: 09/802,995

(22) Filed: Mar. 12, 2001

(65) Prior Publication Data
US 2002/0052821 A1  May 2, 2002

(30) Foreign Application Priority Data
Oct. 26, 2000 (JP) ............................. 2000-326374

(51) Int. Cl.
*G06Q 40/00* (2006.01)
(52) U.S. Cl. ...................... 705/37; 425/36 R
(58) Field of Classification Search ............. 705/35–45
See application file for complete search history.

(56) References Cited

OTHER PUBLICATIONS

Gerard et al., Trading and Manipulation Around Seasoned Equity Offerings, The Journal of Fiance 1993.*

WitCapital.com, Purcahsing New Issues, Buying & Sellings Stocks, 1999.*

* cited by examiner

*Primary Examiner*—R. C. Weisberger
(74) *Attorney, Agent, or Firm*—Staas & Halsey LLP

(57) ABSTRACT

A system and method which support securities transactions, preventing the market price from fluctuating when introducing a new set of securities to the public. In this trade support system, a trade processing unit processes buying and selling orders received online from customers' terminals. Each time a deal is completed, the trade price acquisition unit takes in the resultant trade price. A price evaluation unit determines whether the acquired trade price meets the offering price that is suggested in the prospectus of the public offering. If the former is lower than the latter, the price evaluation unit so notifies a trading order placement unit. A subscription period checking unit, on the other hand, checks whether the present date and time is within the subscription period. The trading order placement unit places a buying or selling order at a price within an allowable range around the suggested offering price, when an excessive difference between the trade price and suggested offering price is found during the subscription period. As a result of the above operation, the market price is stabilized during the subscription period.

9 Claims, 15 Drawing Sheets

| ISSUE CODE: 01234 | | | CURRENT PRICE: 340 (11:50) 11:51:29 | | | | 50a |
|---|---|---|---|---|---|---|---|
| ⌐ OFFER ⌐ | | | | ⌐ BID ⌐ | | | |
| SUM | ORDER | LOT | | LOT | ORDER | SUM | |
| 17 | 4 | 7 | OVER | | | | |
| 10 | 1 | 1 | 368 | | | | |
| 9 | 1 | 1 | 364 | | | | |
| 8 | 1 | 1 | 360 | | | | |
| 7 | 3 | 5 | 350 | | | | |
| 2 | 2 | 2 | 346 | | | | 50b |
| | | | 340 | 1 | 1 | 1 | |
| | | | 334 | 6 | 4 | 7 | |
| | | | 328 | 4 | 2 | 11 | |
| | | | 320 | 5 | 4 | 16 | |
| | | | 310 | 2 | 2 | 18 | |
| | | | UNDER | | | | |
| SELLING ORDER: 1   LOT: 1   PRICE: 340 | | | | | | | 50c |

FIG. 3

FEBRUARY 14, 2000    TIME: 10:00:51

| ISSUE CODE | SECURITY NAME | OPENING PRICE | HIGH PRICE | LOW PRICE | CURRENT PRICE | CHANGE | TRADE VOLUME | LOWEST OFFER | QTY | HIGHEST BID | QTY |
|---|---|---|---|---|---|---|---|---|---|---|---|
| 01234 | ABC | 349 | 360 | 340 | – | –10 | 60K | 350 | 1K | 350 | 5K |
| 01235 | DEF | 300 | 350 | 290 | 340 | +5 | 70K | – | – | – | – |
| 01236 | GHI | 210 | 280 | 200 | 350 | –15 | 6K | – | – | – | – |

FIG. 4

| OBJECT (O) | | HIGH PRICE | | LOW PRICE | |
|---|---|---|---|---|---|
| SUBJECT (S) | | EARLY | LATE | EARLY | LATE |
| HIGH PRICE | EARLY | S=O | S>O | S>O | S>O |
| HIGH PRICE | LATE | S<O | S=O | S>O | S>O |
| LOW PRICE | EARLY | S<O | S<O | S=O | S>O |
| LOW PRICE | LATE | S<O | S<O | S<O | S=O |

FIG. 5

| 71 | 72 | 73 | 74 | 75 | 76 |
|---|---|---|---|---|---|
| CLIENT ID | TRADE TYPE | ISSUE CODE | BUY/SELL | QUANTITY | PRICE |

FIG. 6

| | OFFER | | | BID | | |
|---|---|---|---|---|---|---|
| SUM | ORDER | LOT | | LOT | ORDER | SUM |
| 23 | 4 | 7 | OVER | | | |
| 16 | 1 | 1 | 368 | | | |
| 15 | 1 | 1 | 364 | | | |
| 14 | 1 | 1 | 360 | | | |
| 13 | 3 | 5 | 350 | | | |
| 8 | 2 | 2 | 346 | | | |
| 6 | 1 | 2 | 344 | | | |
| 4 | 1 | 3 | 340 | | | |
| 1 | 1 | 1 | 334 | | | |
| | | | 328 | 1 | 1 | 1 |
| | | | 320 | 4 | 2 | 5 |
| | | | 310 | 2 | 2 | 7 |
| | | | UNDER | | | |

ISSUE CODE: 01234   CURRENT PRICE: 334 (9:30)
APRIL 5 (9:31)

9:20 BUYING ORDER: 1   LOT: 1   PRICE: 328

ISSUE CODE: 01234    CURRENT PRICE: 334 (9:30)    50a
                     APRIL 5 (9:31)

| ┌─ OFFER ─┐ | | | | ┌─ BID ─┐ | | |
|---|---|---|---|---|---|---|
| SUM | ORDER | LOT | | LOT | ORDER | SUM |
| 23 | 4 | 7 | OVER | | | |
| 16 | 1 | 1 | 368 | | | |
| 15 | 1 | 1 | 364 | | | |
| 14 | 1 | 1 | 360 | | | |
| 13 | 3 | 5 | 350 | | | |
| 8 | 2 | 2 | 346 | | | |
| 6 | 1 | 2 | 344 | 6 | 1 | 6 |
| 4 | 1 | 3 | 340 | | | 6 |
| 1 | 1 | 1 | 334 | | | 6 |
| | | | 328 | 1 | 1 | 7 |
| | | | 320 | 4 | 2 | 11 |
| | | | 310 | 2 | 2 | 13 |
| | | | UNDER | | | |

50b

9:31 BUYING ORDER: 1   LOT: 6   PRICE: 344     50c

FIG. 8

| ISSUE CODE: 01234 | | | CURRENT PRICE: 334 (9:30) APRIL 5 (9:31) | | | |
|---|---|---|---|---|---|---|
| ⌐OFFER⌐ | | | | ⌐BID⌐ | | |
| SUM | ORDER | LOT | | LOT | ORDER | SUM |
| 17 | 4 | 7 | OVER | | | |
| 10 | 1 | 1 | 368 | | | |
| 9 | 1 | 1 | 364 | | | |
| 8 | 1 | 1 | 360 | | | |
| 7 | 3 | 5 | 350 | | | |
| 2 | 2 | 2 | 346 | | | |
| | | | 344 | | | |
| | | | 340 | | | |
| | | | 334 | | | |
| | | | 328 | 1 | 1 | 1 |
| | | | 320 | 4 | 2 | 5 |
| | | | 310 | 2 | 2 | 7 |
| | | | UNDER | | | |
| 9:31 BUYING ORDER: 1 LOT: 6 PRICE: 344 | | | | | | |

ISSUE CODE: 01234    CURRENT PRICE: 344 (9:31) ~ 50a
APRIL 5 (9:36)

| ─OFFER─ | | | | ─BID─ | | |
|---|---|---|---|---|---|---|
| SUM | ORDER | LOT | | LOT | ORDER | SUM |
| 17 | 4 | 7 | OVER | | | |
| 10 | 1 | 1 | 368 | | | |
| 9 | 1 | 1 | 364 | | | |
| 8 | 1 | 1 | 360 | | | |
| 7 | 3 | 5 | 350 | | | |
| 2 | 2 | 2 | 346 | | | |
| | | | 344 | 1 | 1 | 1 |
| | | | 340 | | | 1 |
| | | | 334 | | | 1 |
| | | | 328 | 1 | 1 | 2 |
| | | | 320 | 4 | 2 | 6 |
| | | | 310 | 2 | 2 | 8 |
| | | | UNDER | | | |

~50b

9:36 BUYING ORDER: 1    LOT: 1    PRICE: 344    ~50c

FIG. 10

| | | | | ISSUE CODE: 01234 | | | CURRENT PRICE: 344 (9:31) APRIL 5 (9:40) | | |
|---|---|---|---|---|---|---|---|---|---|

| OFFER | | | | BID | | |
|---|---|---|---|---|---|---|
| SUM | ORDER | LOT | | LOT | ORDER | SUM |
| 19 | 4 | 7 | OVER | | | |
| 12 | 1 | 1 | 368 | | | |
| 11 | 1 | 1 | 364 | | | |
| 10 | 1 | 1 | 360 | | | |
| 9 | 3 | 5 | 350 | | | |
| 4 | 2 | 2 | 346 | | | |
| 2 | 2 | 2 | 344 | 1 | 1 | 1 |
| | | | 340 | | | 1 |
| | | | 334 | | | 1 |
| | | | 328 | 1 | 1 | 2 |
| | | | 320 | 4 | 2 | 6 |
| | | | 310 | 2 | 2 | 8 |
| | | | UNDER | | | |

9:40  BUYING ORDER: 1   LOT: 2   PRICE: 344

FIG. 11

| ISSUE CODE: 01234 | | | CURRENT PRICE: 344 (9:40) APRIL 5 (9:40) | | | |
|---|---|---|---|---|---|---|
| ┌─ OFFER ─┐ | | | | ┌─ BID ─┐ | | |
| SUM | ORDER | LOT | | LOT | ORDER | SUM |
| 18 | 4 | 7 | OVER | | | |
| 11 | 1 | 1 | 368 | | | |
| 10 | 1 | 1 | 364 | | | |
| 9 | 1 | 1 | 360 | | | |
| 8 | 3 | 5 | 350 | | | |
| 3 | 2 | 2 | 346 | | | |
| 1 | 1 | 1 | 344 | | | |
| | | | 340 | | | |
| | | | 334 | | | |
| | | | 328 | 1 | 1 | 1 |
| | | | 320 | 4 | 2 | 5 |
| | | | 310 | 2 | 2 | 7 |
| | | | UNDER | | | |

9:40  BUYING ORDER: 1   LOT: 2  PRICE: 344

FIG. 12

| ISSUE CODE: 01234 | | | | CURRENT PRICE: 344 (9:40) APRIL 5 (9:41) | | |
|---|---|---|---|---|---|---|
| ── OFFER ── | | | | ── BID ── | | |
| SUM | ORDER | LOT | | LOT | ORDER | SUM |
| 18 | 4 | 7 | OVER | | | |
| 11 | 1 | 1 | 368 | | | |
| 10 | 1 | 1 | 364 | | | |
| 9 | 1 | 1 | 360 | | | |
| 8 | 3 | 5 | 350 | | | |
| 3 | 2 | 2 | 346 | | | |
| 1 | 1 | 1 | 344 | 1 | 1 | 1 |
| | | | 340 | | | 1 |
| | | | 334 | | | 1 |
| | | | 328 | 1 | 1 | 2 |
| | | | 320 | 4 | 2 | 6 |
| | | | 310 | 2 | 2 | 8 |
| | | | UNDER | | | |

9:41 BUYING ORDER: 1 LOT: 1 PRICE: 344

| ISSUE CODE: 01234 | | | | CURRENT PRICE: 344 (9:41) APRIL 5 (9:41) | | | | 50a |
|---|---|---|---|---|---|---|---|---|
| ⌐— OFFER —⌐ | | | | ⌐— BID —⌐ | | | | |
| SUM | ORDER | LOT | | LOT | ORDER | SUM | | |
| 17 | 4 | 7 | OVER | | | | | |
| 10 | 1 | 1 | 368 | | | | | |
| 9 | 1 | 1 | 364 | | | | | |
| 8 | 1 | 1 | 360 | | | | | |
| 7 | 3 | 5 | 350 | | | | | |
| 2 | 2 | 2 | 346 | | | | | 50b |
| | | | 344 | | | | | |
| | | | 340 | | | | | |
| | | | 334 | | | | | |
| | | | 328 | 1 | 1 | 1 | | |
| | | | 320 | 4 | 2 | 5 | | |
| | | | 310 | 2 | 2 | 7 | | |
| | | | UNDER | | | | | |
| 9:41  BUYING ORDER: 1   LOT: 1   PRICE: 344 | | | | | | | | 50c |

FIG. 14

METHOD AND SYSTEM FOR SUPPORTING TRADE OF SECURITIES

BACKGROUND OF THE INVENTION

1. Field of the Invention

The present invention relates to a method and system for supporting a trade, and more particularly, to a method and system which support and control securities transactions.

2. Description of the Related Art

When a company raises capital by offering a new set of shares or bonds to the public, it will issue a prospectus that provides the specifics of the securities for sale, including such information as their suggested price and the total volume of that public offering. Investors are allowed to apply for the new share offering during a period of about three weeks. After the expiration of that subscription period, all or part of the applicants can purchase the company's new securities which are made available at the suggested price, average price, or optimal price.

On the other hand, the company's existing securities are traded in the secondary market. Its market price, however, may sometimes fall below the suggested offering price of the new securities for sale during the subscription period. This means that the applicants will have to buy the same securities at a higher price than the actual market price, which is an undesirable situation for them.

Conventional stock exchanges used to provide a trading system of open outcry on the trading floor, which allowed the "floor representatives" to manipulate stock prices to solve the above-mentioned problem. The days of such trading systems, however, are gone now. Most modern stock exchanges employ a computerized trading system, where the conventional solution is no longer possible.

SUMMARY OF THE INVENTION

Taking the above into consideration, an object of the present invention is to provide an improved trade supporting system and method to avoid an unwanted price drop during the subscription period, in the interest of the subscribers who agree to buy new securities at the suggested offering price.

To accomplish the above object, according to the present invention, there is provided a method of supporting a trade of securities. This method comprises the following steps: (a) storing a record of a public offering of a new set of securities, the record containing a suggested offering price of the securities and a subscription period of the public offering; (b) processing buying and selling orders for the securities; (c) acquiring a trade price at which the buying and selling orders are executed at the processing step (b); (d) determining whether the trade price acquired at the acquiring step (c) meets the suggested offering price; (e) checking whether the present date and time is within the subscription period; and (f) placing a buying or selling order at a price that is within an allowable range around the suggested offering price, when the determining step (d) has revealed an excessive difference between the trade price and the suggested offering price, and only when the checking step (e) has determined that the present date and time is within the subscription period.

Further, to accomplish the above object, the present invention provides a system which supports a trade of securities. This system comprises the following elements: (a) a storage unit which stores a record of a public offering of a new set of securities, where the record contains a suggested offering price of the securities and a subscription period of the public offering; (b) a trade processing unit which processes buying and selling orders for the securities; (c) a trade price acquisition unit which acquires a trade price at which the buying and selling orders are executed by the trade processing unit; (d) a price evaluation unit which determines whether the acquired trade price matches the suggested offering price; (e) a subscription period checking unit which checks whether the present date and time is within the subscription period; and (f) a trading order placement unit which places a buying or selling order at a price that is within an allowable range around the suggested offering price, when the price evaluation unit has found an excessive difference between the trade price and the suggested offering price, and only when the subscription period checking unit has determined that the present date and time is within the subscription period.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows an example screenshot of the proposed system which appears on the monitor unit shown in FIG. 2;

FIG. 4 shows an example screenshot which appears on the terminals shown in FIG. 2;

FIG. 5 shows how given orders are prioritized in the trade processing;

FIG. 6 shows a typical format of order messages which are sent from a terminal to the trade support system shown in FIG. 2;

FIGS. 7 through 14 provide a series of snapshots of a typical trading information screen that summarizes the bids and offers made to a particular issue.

DESCRIPTION OF THE PREFERRED EMBODIMENTS

Preferred embodiments of the present invention will be described below with reference to the accompanying drawings.

Figure 1:
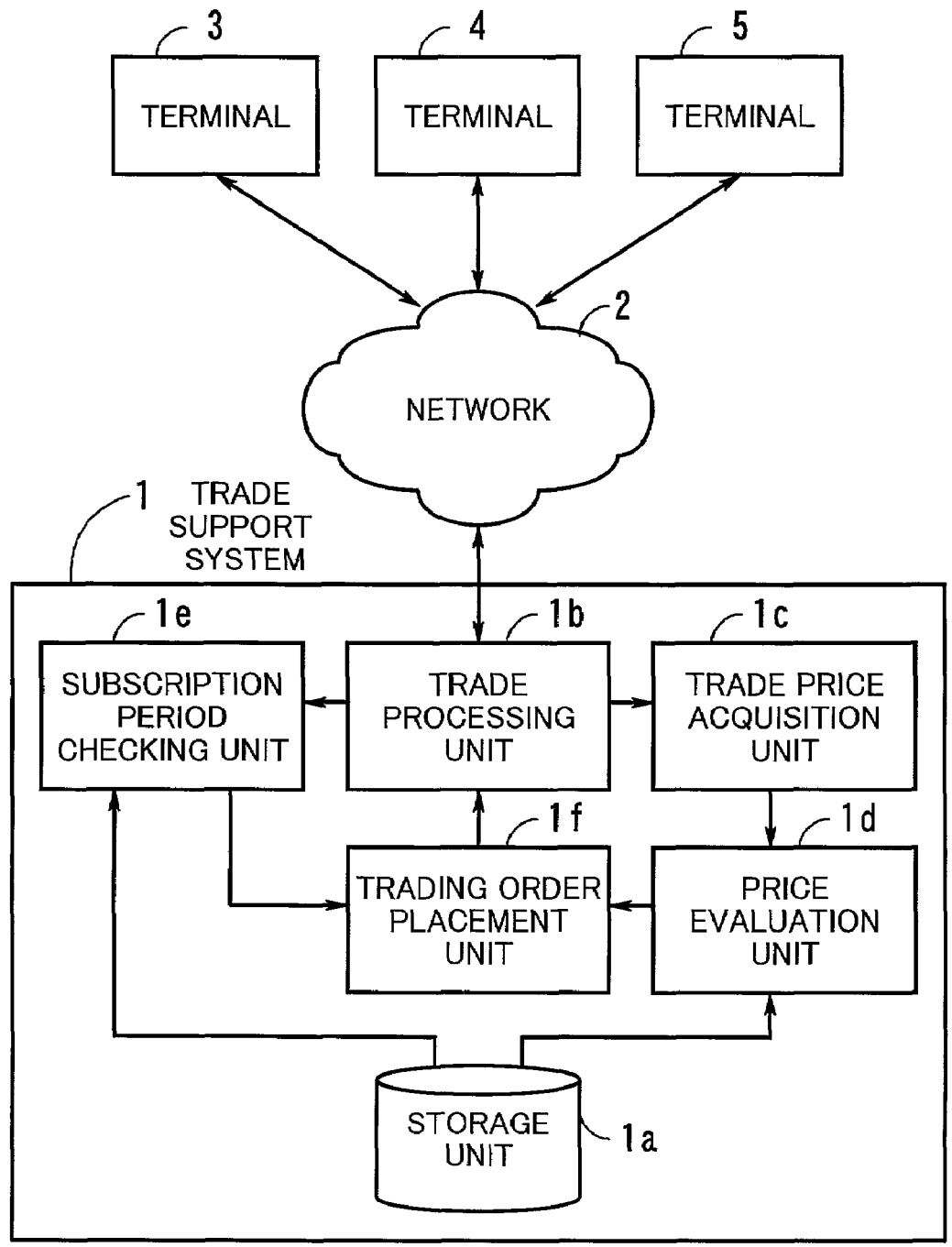
FIG. 1 is a conceptual view of a trade support system according to the present invention.

FIG. 1 is a conceptual view of a trade support system according to the present invention. This trade support system 1 processes buying and selling orders received from terminals 3 to 5, and when a deal is clinched, it executes the orders. To this end, the trade support system 1 comprises the following elements: a storage unit 1a, a trade processing unit 1b, a trade price acquisition unit 1c, a price evaluation unit 1d, and a subscription period checking unit 1e, and a trading order placement unit 1f. The functions of those elements will be described below.

The storage unit 1a stores a record which describes new securities to be introduced to a market. This record includes the definitions of subscription period and suggested offering price. The trade processing unit 1b processes securities transactions, executing the buying and selling orders that match with each other. The trade price acquisition unit 1c obtains a trade price at which the trade processing unit 1b has completed a trade. The price evaluation unit 1d determines whether the obtained trade price meets the suggested offering price. The subscription period checking unit 1e checks whether the present date and time is within the subscription period defined in the record. The trading order placement unit 1f places a buying or selling order at a price within an allowable range around the suggested price, when the price evaluation unit 1d has detected an excessive difference between the trade price and the suggested price, and only when the subscription period checking unit 1e has determined that the present date and time is within the subscription period.

The terminals 3 to 5 are linked to the trade support system 1 via an appropriate network 2 such as the Internet or private lines. Orders from investors are transmitted from those terminals 3 to 5 to the trade support system 1 over the network 2. The terminals 3 to 5 are each equipped with a monitor unit (not shown) to display the current trading conditions in the securities market, which are reported online from the trade support system 1.

The above-described system will operate as follows. For illustrative purposes, it is assumed that a company "ABC" is planning to offer a new set of shares (or bonds) to the public. Consider that their suggested offering price is "400," and the beginning and ending dates of the subscription period (i.e., the opening and closing dates) are defined as "Apr. 1" and "Apr. 20," respectively. To publicize the details of this offering of securities, the issuing company prepares a prospectus which describes its business prospects and defines the opening and closing dates of the subscription, as well as the suggested price. Careful reading of this prospectus enables investors to make an informed investment decision about the company.

Incidentally, it is known that, when a company announces a public offering of a new set of shares or bonds, the price of existing ones circulating in the secondary market is likely to go down on the fear that the profit-sharing ratio would relatively decrease. To cope with this tendency of the market, the proposed trade support system 1 takes measures to prevent the trade price from dropping too much. This price stabilization operation is conducted as follows.

When the market is open, the trade processing unit 1b accepts trading orders entered through the terminals 3 to 5, and if a buying order match with a selling order in terms of their price and quantity, it executes those orders. Each time a deal is completed, the trade price acquisition unit 1c takes in the resultant trade price, which forms the current price of the issue "ABC." Suppose, for example, that a certain customer placed a buying order at a price of "396" which matches with a pending offer at the same price. The trade processing unit 1b processes this deal, allowing the trade price acquisition unit 1c to obtain a new trade price "396." This trade price information about the issue "ABC" is then supplied to the price evaluation unit 1d, which compares it with the suggested offering price retrieved from the storage unit 1a. If the current trade price is lower than the suggested price, the price evaluation unit 1d so notifies the trading order placement unit 1f. In the present example, the trading order placement unit 1f is informed that the trade price "396" is lower than the suggested price "400."

The subscription period checking unit 1e, on the other hand, determines whether the date and time of each executed order is within the specified subscription period. The term "subscription period" denotes such a period during which the applicants can subscribe for the offering of new shares or bonds. As previously stated, it is stored as part of a record in the storage unit 1a. When an transaction is completed during the subscription period, the subscription period checking unit 1e so notifies the trading order placement unit 1f. Think of the above example transaction again and suppose that its completion date is Apr. 2. The trading order placement unit 1f is then informed that the transaction satisfies the subscription period condition.

The trading order placement unit 1f places an appropriate buying or selling order in an attempt to raise the market price up to the suggested offering price as much as possible, when a trade price drop is detected during the subscription period. In the present example, the trading order placement unit if places a buying order for a single trading unit, or one lot, specifying a limit price of "400." If this order is executed, the current trade price of the issue "ABC" will go up to "400".

As described above, the proposed trade support system 1 monitors securities transactions of the issue "ABC" and places appropriate orders in an attempt to maintain the trade price at a desired level. The trade support system 1 repeats such operations until the subscription period expires, thus avoiding undesired price drops.

Figure 2:
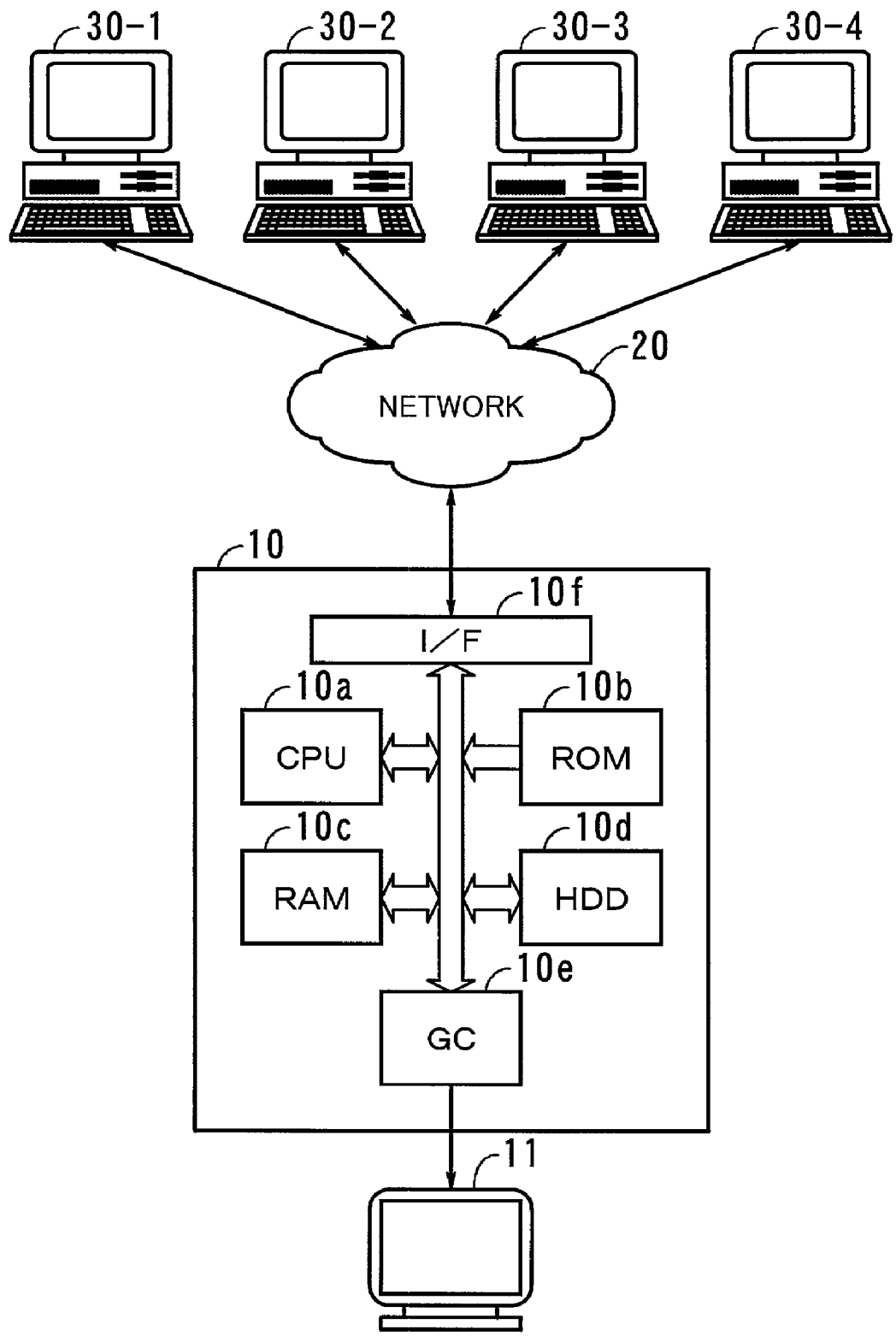
FIG. 2 shows a typical configuration of a system where the present invention is embodied.

Referring next to FIG. 2, a more specific embodiment of the present invention is shown. In the block diagram of FIG. 2, a trade support system 10 is linked to a plurality of terminals 30-1 to 30-4 via a network 20. The trade support system 10 processes buying and selling orders received from those terminals 30-1 to 30-4.

The trade support system 10 comprises the following components: a central processing unit (CPU) 10a, a read-only memory (ROM) 10b, a random access memory (RAM) 10c, a hard disk drive (HDD) 10d, a graphics control card (GC) 10e, and a network interface (I/F) 10f. An external monitor unit 11 is coupled to the trade support system 10 through the graphics control card 10e.

The CPU 10a performs various operations according to programs stored in the HDD 10d, besides controlling other parts of the system 10. The ROM 10b stores basic programs and data that the CPU 10a executes and manipulates. The RAM 10c serves as temporary storage for application programs and scratchpad data that the CPU 10a executes and manipulates at runtime. The HDD 10d stores application programs executed by the CPU 10a, as well as data related to the order processing. The graphics control card 10e produces image data in accordance with drawing commands from the CPU and provides the monitor unit 11 with the resultant images in the form of video signals. The network interface 10f performs protocol translation and data format conversion to allow the CPU 10a to communicate with the terminals 30-1 to 30-4 via the network 20. The monitor unit 11 comprises a display device such as a cathode ray tube (CRT) to display characters and images supplied from the graphics control card 10e.

The network 20 serves as a data transmission medium between the trade support system 10 and terminals 30-1 to 30-4. The Internet, private lines, or any other appropriate network is used for this purpose. The terminals 30-1 to 30-4 are end stations located in the customers' (investors') sites, each constructed on an appropriate software and hardware platform such as personal computers.

Before discussing the detailed operation of the embodiment shown in FIG. 2, the following section will briefly describe how the bids and offers are traded.

FIG. 3 shows an example window which appears on the monitor unit 11 (FIG. 2) to provide trading-related information. Using such screens, traders execute the orders on behalf of their customers. More specifically, the window 50 consists of three panes 50a, 50b, and 50c. The topmost pane 50a tells which issue is being traded, by indicating its issue code (e.g., "01234"). The right half of the same pane 50a shows the current trade price of the issue, along with its last transaction time in parentheses. Shown below the trade price is the present time of day.

The next pane 50b summarizes the current situation of buying orders (bids) and selling orders (offers), sorting them by price. The quoted prices are shown in the middle column of the pane 50b. On the left-hand columns, the pending offers are listed in descending order of price, while the bids are listed on the right-hand columns in the same way. In those listings, the columns titled "LOT" show the quantity of securities for sale or purchase. The term "lot" denotes the minimum trading unit of securities; in the present example, one lot means an order of one thousand shares. The columns titled "ORDER" refer to the number of buying or selling orders being placed at each price. The column titled "SUM" in the selling order listing indicates the cumulative number of securities being offered for sale at the prices equal to or lower than the price of each row. Its counterpart in the buying order listing shows the cumulative number of securities being bid for purchase at the prices equal to or higher than the price of each row. The bottommost pane 50b indicates a buying or selling order that is newly entered.

FIG. 4 shows a window which appears on the monitor screen of the terminals 30-1 to 30-4. With the trading information provided in such screens, the investors determine what orders to send. This example window 60 has two panes 60a and 60b. The upper pane 60a shows the date and time, while the lower pane 60b summarizes the information about various issues in table form. More specifically, the table in the pane 60b comprises the following data fields: "Issue Code," "Security Name," "Opening Price," "High Price," "Low Price," "Current Price," "Change," "Trade Volume," "Lowest Offer" and its "Quantity" (QTY), and "Highest Bid" and its "Quantity" (QTY). The "Issue Code" and "Security Name" fields show the identification number and security name assigned to each listed company. These fields are followed by four intraday price fields that describe the behavior of a security price in the consecutive trading hours in a day. More specifically, the "Opening Price" field indicates the price at which the first transaction was completed. The "High Price" and "Low Price" fields indicate the highest and lowest intraday prices of a security that has actually changed hands between a buyer and a seller. The "Current Price" field shows the price at which the latest transaction was made. The "Change" field indicates the price rise or drop from the average price on the previous business day. The "Trade Volume" indicates the total quantity of shares that have been traded so far since the beginning of the business hours. The "Lowest Offer" field and its corresponding "Quantity" field show the lowest price quotation and volume among the currently available selling orders that have not been traded yet. Similarly, the "Highest Bid" field and its corresponding "Quantity" field show the highest price quotation and volume among the currently available buying orders that have not been traded yet.

FIG. 5 shows how the received orders are prioritized in terms of prices and reception times. In this priority table, the "Subject" (S) refers to a person or company that wishes to buy or sell a security, while the "Object" (O) denotes their competitors. The expression "S>O" means that the subject is given a higher priority than the subject, and "S<O" represents the opposite. The expression "S=O" means that the two entities are handled equally. Suppose, for example, that both the subject and object are offering a high price. In this case, the two orders are prioritized in the order of their receipt. In another case where the subject and object have placed an order at the same time, their priorities are determined by their prices.

FIG. 6 shows a typical format of orders which are sent from the terminals 30-1 to 30-4 to the trade support system 10 shown in FIG. 2. An order message comprises the following data fields: "Client ID," "Trade Type," "Issue Code," "Buy/Sell," "Quantity," and "Price."

The "Client ID" field 71 contains a unique identification number assigned to each customer. The "Trade Type" field 72 contains a trade type code which indicates whether the order is an ordinary transaction (e.g., code "1") or a cross (e.g., code "2"), where the term "cross" refers to a securities transaction in which the same broker acts as agent for both sides of the trade. The "Issue Code" field 73 specifies the issue for sale or purchase. The "Buy/Sell" field 74 carries a code which indicates whether the order is a selling order (e.g., code "1") or a buying order (e.g., code "2"). The "Quantity" field 75 and "Price" field 76 specify the volume and limit price of the offer or bid.

Referring now to the FIG. 7, the operation of the trade support system 10 (FIG. 2) will be described in greater detail below. For illustrative purposes, assume that a new set of shares designated by the issue code "01234" is to be offered for sale in a stock exchange. According to the prospectus, their suggested price range is from "344" (minimum price) to "350" (maximum price), and the subscription is scheduled to be accepted during the period of Apr. 5 through Apr. 25.

In the trading session on Apr. 5, the beginning of the subscription period, the first bids and offers for the issue "01234" are made, and its opening price is determined upon completion of the first transaction. FIG. 7 is a snapshot of the trading information screen just after the market is opened. In this example screen, the opening price "334" is indicated as the current trade price. There are unexecuted buying and selling orders which are not in the condition of agreement.

In the proposed trade support system 10, the prospectus of the issue "01234" is stored in its HDD 10d. Consulting its local calendar clock, and comparing the present date and time with schedule data retrieved from the HDD 10d, the CPU 10a recognizes the beginning of the specified subscription period. The CPU 10a subsequently compares the opening price "334" with the minimum price "344," thus detecting that the opening price is far below the allowable minimum price. It is concerned, in such a situation, that the general feeling of investors would be unstable. To prevent the investors from overreacting, it is necessary to manipulate the price to some extent. To this end, the CPU 10a first obtains the cumulative sum of shares being offered at lower prices than the minimum price, which is "344" in the present example. It then places a counter order with the minimum price "344" for buying as many shares as the obtained cumulative sum. In the example of FIG. 7, such low-price offers amount to six lots. Accordingly, the CPU 10a makes a bid for six lots of shares, specifying the price of "344."

The above operation of the trade support system 10 will result in a new trading information screen of FIG. 8. This screen shows that a new buying order (six lots, price "344") was accepted at 9:31. Now that there is a match between bids and offers, the trade support system 10 executes the orders of "344" or below. This updates the trading information screen as shown in FIG. 9, changing the current trade price from "334" to "344." The terminal screen of FIG. 4 will also be updated accordingly.

The above-described price stabilization operation automatically corrects the trade price not to fall below the minimum price specified in the prospectus, even if an undesirable opening price is quoted. While the embodiment has been explained with the assumption that the market price falls below the allowable minimum price, it is not intended to limit the scope of the invention to this specific example. Rather, the present invention can also be applied to such a situation where the market price exceeds the given maximum price. In that case, the proposed system will place a selling order to lower the price.

After finishing the above processing, the CPU 10*a* calls a routine which places a single-lot buying order at predetermined intervals. The detailed operation of this routine will now be illustrated below.

When the opening price is determined, the CPU 10*a* sets an interval timer with a period of, for example, five minutes. The first expiration of this five-minute interval timer causes the CPU 10*a* to make a bid for purchasing a single lot of shares at a price of "344" per share, resulting in an updated trading information screen of FIG. 10. Indicated in the row of price "344" of this screen is the latest buying order that was placed at 9:36.

Suppose that two selling orders are then placed by some investors who wish to sell two lots of shares at the price of "344." This causes still another update of the trading information screen as shown in FIG. 11. Now that there is a match between the bid and offer at the price of "344," the trade support system 10 executes the relevant orders, thus generating a new trading information screen shown in FIG. 12. This screen indicates that the offers and bids at the price "344" have been reduced by the matched quantity, the balance being a pending offer for sale of a single lot.

Upon expiration of another five minutes, the CPU 10*a* places the same buying order again, which brings about yet another updated trading information screen of FIG. 13. The additional single-lot buying order is seen on the right-hand side of the row of price "344" in this example screen. The trade support system 10 immediately executes this buying order since there is a previously entered selling order at the same price level. Finally, these orders are cleared out of the screen, as shown in FIG. 14.

While the trading information screen provides the traders with a comprehensive view of current bids and offers as described in FIGS. 7 to 14, the investors sitting at their terminals 30-1 to 30-4 are only allowed to see the behavior of the current price (see FIG. 4). The buying orders that are regularly generated by the trade support system 10 will cause the investors to have a good impression about the stability of the issue, although the resulting trade itself is relatively small in volume. As a result of this operation, the securities transactions will be conducted at a moderate pace.

While the above-described trade support system 10 regularly places a single-lot buying order, it is not intended to limit the invention to this specific size of order. The system may also be configured to make a bid or offer for two or more lots each time to regulate the price.

Further, the above-described embodiment may be modified so that the ordering interval will be varied according to the actual behavior of the securities price, instead of generating a constant buying order at regular intervals. That is, the interval may be extended when the price is stable, or shortened when a wild price fluctuation is observed. More particularly, the trade support system may be configured to keep track of the average price of the security of interest and place an order at an appropriate price adaptively in accordance with the movement of the average price.

While no mention has been made of the upper limit of the system-produced orders, the trade support system has to keep track of the total number of shares that have been offered to the market. The system is only allowed to make an offer within the quantity range of the planned public offering. Each time it places a new order, the system will check the current state and control the total quantity of offered shares so as not to exceed that limit. Or, alternatively, the system will control the total number of offered securities, so that they will not exceed the number of existing securities and new securities for sale in the public offering.

Figure 15:
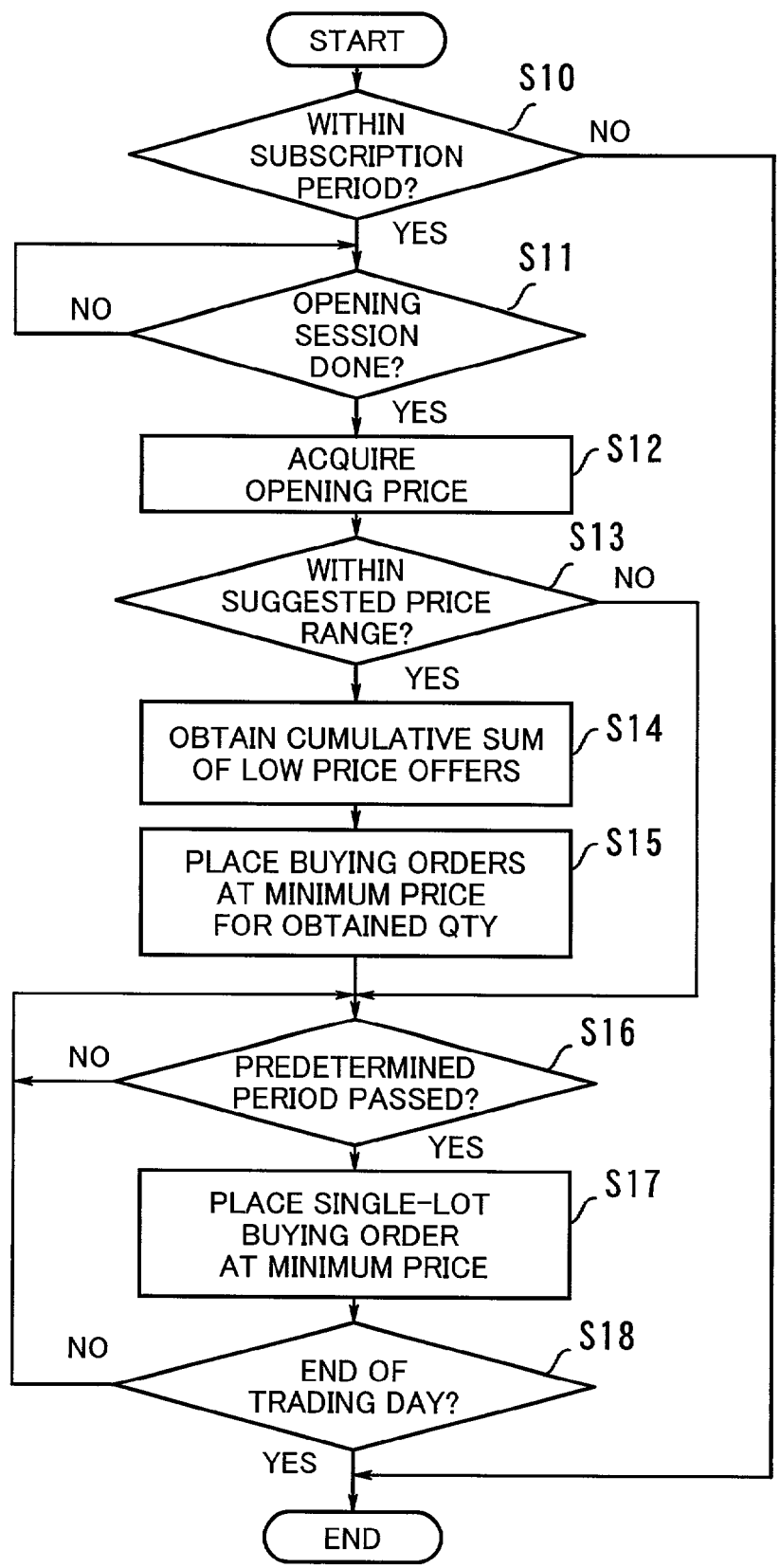
FIG. 15 is a flowchart showing a process executed by the proposed trade support system.

Referring lastly to the flowchart of FIG. 15, a process executed by the trade support system 10 according to the present invention. This process is invoked at the beginning of each trading day and involves the following steps.

(S10) Retrieving a relevant prospectus record from its local HDD 10*d*, the CPU 10*a* determines whether the present date and time is within the specified subscription period. If so, the process advances to step S11. If not, the process is terminated.

(S11) The CPU 10*a* consults a calendar clock (not shown) to determine whether the opening session is finished. If so, the process advances to step S12. If not, the process repeats the same step S11.

(S12) The CPU 10*a* acquires the opening price.

(S13) Referring again to the prospectus record retrieved from the HDD 10*d*, the CPU 10*a* determines whether the opening price obtained at step S12 is within the suggested price range. If so, the process advances to step S16. Otherwise, the process skips to step S14.

(S14) The CPU 10*a* makes access to the latest trading information stored in the HDD 10*d* to identify the number of shares that are being offered at unsatisfactorily low prices. More specifically, it obtains the cumulative sum of the pending offers whose prices are equal to or lower than the minimum price (i.e., the lower end of the suggested price range).

(S15) The CPU 10*a* places a buying order at the minimum price in an attempt to purchase as many shares as the number of low-price shares identified at step S14.

(S16) The CPU 10*a* waits for the expiration of its local interval timer (not shown) which has been programmed with a predetermined interval parameter. Upon expiration, the process advances to step S17.

(S17) The CPU 10*a* places a single lot buying order at the minimum price.

(S18) The CPU 10*a* determines whether it has reached the end of the trading day. If so, the process is terminated. Otherwise, it returns to step S16 to repeat the last three steps.

The above-described processing mechanisms are actually implemented as software functions of a computer system. Every processing step of the proposed trade supporting method is encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion is summarized as follows. According to the present invention, the trade price is acquired each time a deal is completed, and it is determined whether the trade price meets the offering price that is suggested in the prospectus of a public offering. If an excessive difference between the two prices is found during the subscription period, a buying or selling order is placed at a price within an allowable range around the suggested offering price. The above operation prevents an unwanted price drop from happening during the subscription period. This feature of the present invention is beneficial to both the existing shareholders and the subscribers to the new share issue.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-implemented method for directing a computer system to support a trade of securities, the method comprising:
   storing a record of a public offering of a new set of securities, the record containing a suggested offering price of the securities and a subscription period of the public offering;
   processing electronically and without manual intervention in a computer system buying and selling orders for the securities in a secondary market;
   identifying electronically and without manual intervention a trade price at which the buying and selling orders have been executed in the secondary market;
   determining electronically and without manual intervention whether the identified trade price is below the suggested offering price;
   checking electronically and without manual intervention whether the present date and time are within the subscription period;
   placing electronically and without manual intervention a buying order in a computer system at the suggested offering price, when said determining has revealed that the trade price is below the suggested offering price, and only when said checking has determined that the present date and time are within the subscription period; and
   repetitively placing electronically and without manual intervention an additional buying order for a predetermined quantity at the suggested offering price at predetermined intervals, after the buying order has been placed.

2. The method according to claim 1, wherein said identifying of the trade price identifies an opening price of the securities that has been reached in an opening session.

3. The method according to claim 2, wherein said placing of the buying order obtains a cumulative sum of pending offers whose prices are equal to or lower than the suggested offering price, and places a buying order at the suggested offering price in an attempt to purchase as many securities as the obtained cumulative sum of the pending offers, if the opening price is lower than the suggested offering price.

4. The method according to claim 2, wherein said placing of the buying order obtains a cumulative sum of pending bids whose prices are equal to or higher than the suggested offering price, and places a selling order at the suggested offering price in an attempt to sell as many securities as the obtained cumulative sum of the pending bids, if the opening price is higher than the suggested offering price.

5. The method according to claim 1, wherein the suggested offering price is given as an allowable range of prices between a minimum price and a maximum price as designated in a prospectus; and
   wherein said placing places the buying order at a predetermined price in accordance with an average price of the securities.

6. The method according to claim 1, wherein said placing places the buying order, while controlling a total number of offered securities, so as not to exceed a number of new securities for sale in the public offering.

7. The method according to claim 1, wherein said placing places the buying order, while controlling a total number of offered securities, so as not to exceed a number of existing securities and new securities for sale in the public offering.

8. A system for supporting a trade of securities, comprising:
   storage means for storing a record of a public offering of a new set of securities, the record containing a suggested offering price of the securities and a subscription period of the public offering;
   trade processing means for processing electronically and without manual intervention buying and selling orders for the securities in a secondary market;
   trade price acquisition means for identifying electronically and without manual intervention a trade price at which the buying and selling orders have been executed in the secondary market;
   price evaluation means for determining electronically and without manual intervention whether the identified trade price is below the suggested offering price;
   subscription period checking means for checking electronically and without manual intervention whether the present date and time are within the subscription period; and
   trading order placement means for placing electronically and without manual intervention a buying order at the suggested offering price, when said price evaluation means has found that the trade price is below the suggested offering price, and only when said subscription period checking means has determined that the present date and time are within the subscription period; and for repetitively placing electronically and without manual intervention an additional buying order for a predetermined quantity at the suggested offering price at predetermined intervals.

9. A computer-readable medium storing a program for supporting a trade of securities, the program causing a computer system to function as:
   storage means for storing a record of a public offering of a new set of securities, the record containing a suggested offering price of the securities and a subscription period of the public offering;
   trade processing means for processing electronically and without manual intervention buying and selling orders for the securities in a secondary market;
   trade price acquisition means for identifying electronically and without manual intervention a trade price at which the buying and selling orders have been executed in the secondary market;
   price evaluation means for determining electronically and without manual intervention whether the identified trade price is below the suggested offering price;
   subscription period checking means for checking electronically and without manual intervention whether the present date and time are within the subscription period; and trading order placement means for placing electronically and without manual intervention a buying order at the suggested offering price, when said price evaluation means has found that the trade price is below the suggested offering price, and only when said subscription period checking means has determined that the present date and time are within the subscription period, and for repetitively placing electronically and without manual intervention an additional buying order for a predetermined quantity at the suggested offering price at predetermined intervals.

* * * * *

UNITED STATES PATENT AND TRADEMARK OFFICE
CERTIFICATE OF CORRECTION

PATENT NO. : 7,277,868 B2  Page 1 of 1
APPLICATION NO. : 09/802995
DATED : October 2, 2007
INVENTOR(S) : Shigehiko Terashima It is certified that error appears in the above-identified patent and that said Letters Patent is hereby corrected as shown below:

Title Page, Column 1 Item 56 (Other Publications), Line 2, change "Fiance" to --Finance--.

Title Page, Column 2 Item 56 (Other Publications), Line 1, change "Purcahsing" to --Purchasing--.

Title Page, Column 2 Item 56 (Other Publications), Line 1, change "Sellings" to --Selling--.

Signed and Sealed this

Eighth Day of April, 2008

JON W. DUDAS
*Director of the United States Patent and Trademark Office*